(12) United States Patent
Taleghani et al.

(10) Patent No.: US 12,331,242 B2
(45) Date of Patent: Jun. 17, 2025

(54) USING GRAPHITE NANO-PLATELETS TO IMPROVE THE INTEGRITY OF OIL AND GAS WELLS

(71) Applicant: THE PENN STATE RESEARCH FOUNDATION, University Park, PA (US)

(72) Inventors: Arash Dahi Taleghani, University Park, PA (US); Seyedeh Maryam Tabatabaei, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 18/172,697

(22) Filed: Feb. 22, 2023

(65) Prior Publication Data

US 2023/0193110 A1    Jun. 22, 2023

Related U.S. Application Data

(62) Division of application No. 16/836,414, filed on Mar. 31, 2020, now Pat. No. 11,618,843.

(60) Provisional application No. 62/827,464, filed on Apr. 1, 2019.

(51) Int. Cl.
    *C09K 8/467*      (2006.01)
    *C09K 8/42*      (2006.01)

(52) U.S. Cl.
    CPC .............. *C09K 8/467* (2013.01); *C09K 8/426* (2013.01); *C09K 2208/10* (2013.01)

(58) Field of Classification Search
CPC ..... C09K 8/426; C09K 8/467; C09K 2208/10
See application file for complete search history.

(56) References Cited

U.S. PATENT DOCUMENTS

| | | | | |
|---|---|---|---|---|
| 2012/0007913 A1* | 1/2012 | Jang | ..................... | H05K 9/0092 347/20 |
| 2013/0102460 A1* | 4/2013 | Ramaprabhu | ........... | C08L 79/02 977/734 |
| 2017/0240426 A1* | 8/2017 | Hu | ........................ | C01B 32/168 |

\* cited by examiner

*Primary Examiner* — Aiqun Li
(74) *Attorney, Agent, or Firm* — Buchanan Ingersoll & Rooney PC

(57) ABSTRACT

Embodiments relate to use of graphite nanoplatelets (GnP) to enhance the mechanical and durability characteristics of cement that may be used as cement sheaths in wellbores of oil and gas wells. Generally, undesired permeability of cement is caused by diffusion of trapped oil and/or natural gas through the cementitious matrix of the cement, leading to material degradation of the cement. Methods disclosed involve using modified GnPs (having physically modified surfaces or chemically modified surfaces energies) to generate a cementitious nanocomposite with uniformly dispersed GnPs, which can effectively arrest the undesired diffusion mechanism. Modified GnPs can also increase the strength of interfacial adhesion (e.g., interfacial bonds and interfacial energies) between the GnP and the cement matrix (e.g., hydrations of the cement). Physical modification of GnP can involve non-covalent treatment techniques. Chemical modification of GnP can involve covalent treatment techniques.

5 Claims, 19 Drawing Sheets

(first)      (second)      (sixth)      (fifteenth)

USING GRAPHITE NANO-PLATELETS TO IMPROVE THE INTEGRITY OF OIL AND GAS WELLS

CROSS-REFERENCE TO RELATED APPLICATIONS

This application is a divisional application to U.S. application Ser. No. 16/836,414, filed on Mar. 31, 2020, which is related to and claims the benefit of U.S. Provisional Application No. 62/827,464, filed on Apr. 1, 2019, the entire contents of each is incorporated herein by reference.

FIELD OF THE INVENTION

Embodiments relate to the use of modified graphite nano-platelets (graphite nanoplatelets having physically modified surfaces or chemically modified surfaces energies) to enhance the mechanical and durability characteristics of cement that may be used as cement sheaths in wellbores of oil and gas wells.

BACKGROUND OF THE INVENTION

Conventional systems and methods for improving mechanical characteristics of cement sheaths and/or wellbores can be appreciated from U.S. Pat. Nos. 6,457,524, 7,156,173, U.S. Pat. Publ. No. 2008/0134942, U.S. Pat. Publ. No. 2009/0229494, U.S. Pat. Publ. No. 2011/0107942, U.S. Pat. Publ. No. 2011/0067864, U.S. Pat. Publ. No. 2017/0166722, New Cement Formulations Utilizing Graphene Nano Platelets to Improve Cement Properties and Long-Term Reliability in Oil Wells by Alkhami et al. SPE-192342-MS, Society of Petroleum Engineers, 2018, avail, and The Use of Low-Cost Graphite Nanomaterials to Enhance Zonal Isolation in Oil and Gas Wells by Payvandi et al., SPE-187105-MS. Society of Petroleum Engineers, 2017. Conventional systems require use of expensive forms of nano-particle and nano-particle treatment techniques. In addition, conventional systems do not effectively provide adequate dispersion of nano-particles within the cementitious matrix. Moreover, conventional systems fail to provide adequate strength of the interfacial bond and energy between nano-additives and the matrix. These and other disadvantages may limit the use of conventional systems.

BRIEF SUMMARY OF THE INVENTION

Embodiments relate to the use of nanoparticles to enhance the mechanical and durability characteristics (e.g., integrity, ductility, toughness, compressive strength, tensile strength, flexural strength, shear bond strength, fracture properties, nanoscale properties, microstructure, permeability, viscosity, Rheological properties, thickening time, free fluid movement, etc.) of cement that may be used as cement sheaths in wellbores of oil and gas wells. Nanoparticles can be configured to have large surface areas and high aspect ratios, which can increase the van der Walls interaction between particles. This aspect of the nanoparticles can be exploited to influence mechanical and other material properties of cement if the nanoparticles are used as additives in the cement, thereby making nanoparticles attractive candidates as additives used in cement. Use of nanoparticles for this purpose is known to those skilled in the art.

Embodiments disclosed herein relate to the use of modified graphite nanoplatelets (graphite nanoplatelets (GnP) having physically modified surfaces and/or chemically modified surfaces energies) to enhance the mechanical and durability characteristics of cement or cementitious nanocomposite used to make the cement. GnPs have large surface areas and high aspect ratios, and thus modifying their surface chemistry can be a means to control dispersion uniformity and interfacial adhesion of GnPs when used as additives in the cement. It should be noted that other dispersion techniques (e.g., mechanical dispersion via ultra-sonication and high shear stirring) can be used to augment any of the dispersion methods disclosed herein. The modified GnPs can be used to: 1) influence the uniformity with which the GnPs are dispersed within the cement and/or cementitious nanocomposite; and 2) influence the interfacial adhesion between the modified GnP and the cement matrix. The concentration of GnPs within the cement and/or cementitious nanocomposite can be adjusted to further enhance the mechanical and durability characteristics.

Uniform distribution of GnPs throughout the cement can inhibit or prevent diffusion of material (e.g., trapped oil and/or natural gas) through the pore network and the microcracks of the cement. Diffusion of the material through the cement can otherwise lead to material degradation of the cement. Uniform dispersion of GnPs inhibits or prevents this diffusion mechanism, because when GnPs are not dispersed completely they interact with each other through the electrostatic forces, leading to the formation of a flocculated structure. In a slurry cement formation, the weight of the cementitious material is typically transmitted to the bottom of slurry by the gel lattice of the cement. Consequently, a structural deformation happens within the cement, whereby water is squeezed out of the lower parts of the slurry and migrates upward the less-stressed upper layers. The capacity of the higher layers to accommodate the additional water is limited, resulting in a layer of water accumulating at the top of the cement slurry. This separation and movement of water from the bottom of the slurry upward the higher layers can cause channels within the cement, which will promote the probability of gas migration and impair zonal isolation. In other words, the free water coalesces to form a continuous channel on the upper side of the cement sheath and develops a path by which the oil and gas can migrate. Modifying the surface energies of the GnPs can improve the uniformity with which the GnPs are dispersed, mitigating this diffusion effect.

Modified GnPs enhance interfacial adhesion by generating higher bond strength between the modified GnPs and the hydrations (C—S—H, calcium hydroxide, etc.) of cement. Improved interfacial adhesion can inhibit or prevent debonding of the cement from the casing and/or the surrounding rock formation of the wellbore.

Uniform dispersion and increased interfacial adhesion, along with adjustment of GnP concentrations, can be used to generate a cementitious nanocomposite that may be used as a component to cement such that the cement exhibits the enhanced mechanical and durability properties that are desirous for use as cement sheaths in wellbores.

It should be noted that conventional methods rely on the use of carbon nanotubes (CNTs) or carbon nanofibers (CNFs), and also focus on uniform dispersion of CNTs and CNFs in cementitious nanocomposites. CNTs and CNFs, however, are very expensive ($500 per pound), which render them impractical for oilfield applications. In addition, cements made with CNT- or CNF-cementitious nanocomposites require implementation of burdensome curing procedures.

It should be further noted that conventional dispersion techniques rely on mechanical approaches that exploit the intrinsic hydrophobicity of graphitic surfaces. As will be explained, embodiments of the dispersion methods disclosed herein use physical modified surfaces and/or chemical surface modification of GnPs to introduce hydrophilic groups on the free surfaces of graphite sheets.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages and possible applications of the present invention will be more apparent from the following more particular description thereof, presented in conjunction with the following drawings, in which:

FIG. 16 illustrates an exemplary experimental set-up for injection test to measure the depth of slurry penetration into a channel with the thickness of 120 μm and width of 1 in.

DETAILED DESCRIPTION OF THE INVENTION

Figure 1:
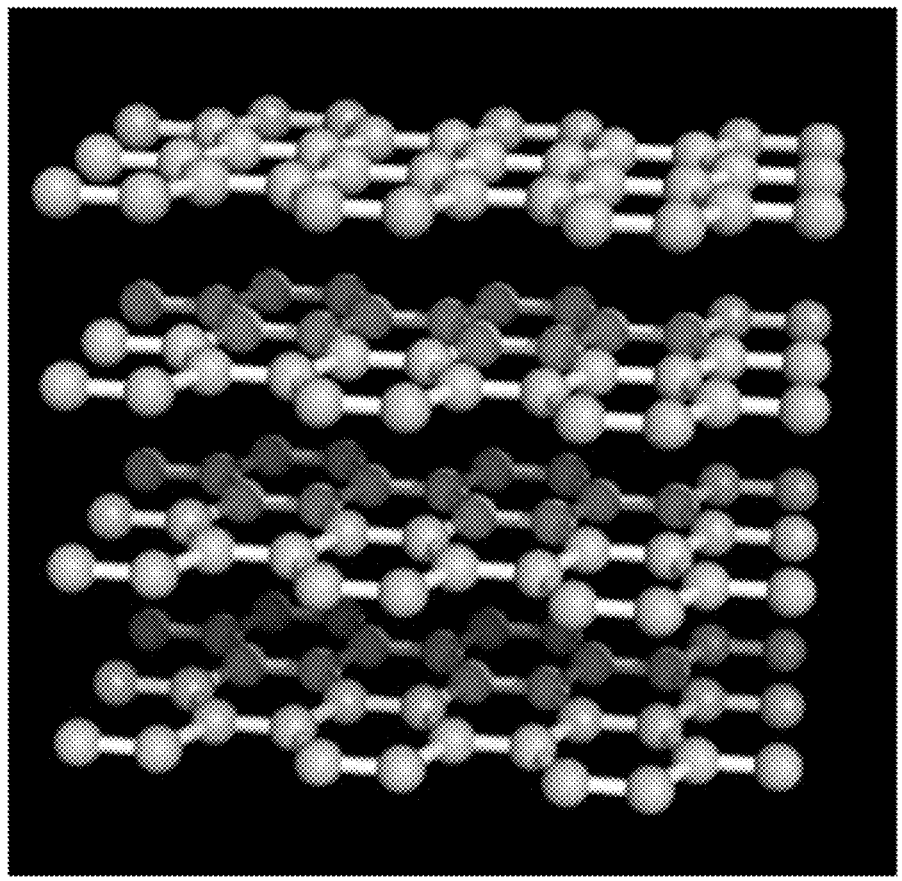
FIG. 1 is a schematic presentation of an embodiment of GnP.

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Embodiments can include a cementitious nanocomposite that may be used as a component of cement. It is contemplated for the cement to be used as cement sheaths for supporting casings that are used in wellbores of oil and gas wells; however, the cement can be used for other applications. The cementitious nanocomposite can include graphite nanoplatelets (GnP) dispersed within the cementitious nanocomposite. For example, the cementitious nanocomposite can include a binder (e.g., lime, calcium silicate, etc.), aggregate (e.g., sand, gravel, etc.) and an additive (e.g., GnP). While other materials, compositions, and additives can be used to generate the cementitious nanocomposite, it is contemplated for GnP to be used as at least one of the additives.

The distribution of the GnPs throughout the cementitious nanocomposite can be uniform so as to inhibit or prevent the diffusion of environmental materials (e.g., trapped oil and/or natural gas) through the pore network and the micro-cracks of cement formed by the cementitious nanocomposite. The distribution of the GnPs can be influenced by surface energy modification of the GnPs. Surface energy modification of the GnPs can also affect the strength of interfacial adhesion (e.g., interfacial bonds and interfacial energies) between the GnP and the cement matrix (e.g., hydrations of the cement). The ability to inhibit or prevent diffusion of environmental materials and the ability to increase the interfacial adhesion can improve the mechanical and durability properties of the cement, and in particular the properties typically desired for cement sheaths.

Additional embodiments can include methods of making and using cement (or cementitious nanocomposite for the cement), the method involving dispersing GnPs within a cementitious nanocomposite. The method can involve modifying the surface energy of the GnPs via chemical and/or the surface of the GnP via physical modification to generate modified GnPs. Use of modified GnPs can influence the dispersion of GnPs within the cementitious nanocomposite, and more precisely, within the aqueous media. For instance, a cementitious nanocomposite with modified GnPs can have a more uniform GnP distribution than a cementitious nanocomposite having non-modified GnPs or having some other additive. Embodiments of the chemical surface energy alteration technique can involve oxygen functionalizing the surface of the GnPs, which may be done via acid functionalization. Embodiments of the physical surface alteration technique can involve polymer wrapping via different types of polymer, for example, a) poly acrylic acid (PAA); or b) a combination of polyvinyl pyrrolidone (PVP) and sodium dodecyl sulfate (SDS).

As noted herein, embodiments can relate to a cementitious nanocomposite, or methods of making and using the same, to be used as a component for cement. The cementitious nanocomposite can have modified GnPs added to the cementitious nanocomposite. The cementitious nanocomposite may or may not be mixed with other cementitious material or additives to form the cement. As noted herein, it is contemplated for the cement to be used as a component for a cement sheath for a wellbore of an oil or gas well. For instance, a wellbore can include a casing (e.g., a hollow pipe placed inside the wellbore) that is cemented in place by introducing a cement sheath around casing. The permeability of the cement can allow for the diffusion of trapped oil and/or natural gas through the pore network and the microcracks of cementitious media of the cement, leading to environmental, safety, and structural concerns. For instance, the diffusion of trapped oil and/or natural gas can degrade the mechanical properties of the cement. Embodiments of the cementitious nanocomposite, and methods of making and using the same, can include incorporating modified GnPs to inhibit or prevent this diffusion mechanism.

Referring to FIG. 1, embodiments of the GnPs can include a three-dimensional (3D) structure composed of a few to several parallel graphene sheets. The overall thickness of the GnP can be within the range of 1 nanometer. The theoretical surface area of the GnP can be calculated to be as high as 2630-2965 $m^2/g$. In some embodiments, carbon atoms within each basal plane of the GnP possess $sp^2$ hybridized orbitals that are covalently bonded to three other adjacent atoms located in the same plane. The fourth valence electron with a delocalized $\pi$ orbital is paired with another delocalized electron located on the neighboring graphene layer. These $\pi$-$\pi$ interactions weakly bond adjacent graphene sheets by van der Waals forces.

Embodiments of the GnP can be modified to generate modified GnP. This can include modifying the surface energy of the GnP. This can be achieved by functionalizing the GnP surface to causing active sites of the GnP to adjust in hydrophilicity, hydrophobicity, surface charge, surface energy, etc. It is contemplated to modify the surface energy so as to improve the chemical compatibility of the GnP within their matrix by enhancing their wetting or adhesion characteristics and reducing their tendency to agglomerate (i.e., providing more uniform dispersion) while incorporated into the cementitious nanocomposite. This modification can also improve the bonding between GnP and the cement matrix. As a none-limiting example, some embodiments can include functionalizing the GnP surface to introduce hydrophilic groups on the free surfaces of the GnP sheet. Generating modified GnP can involve physical surface alteration techniques and/or chemical surface energy alteration techniques.

Figure 2:
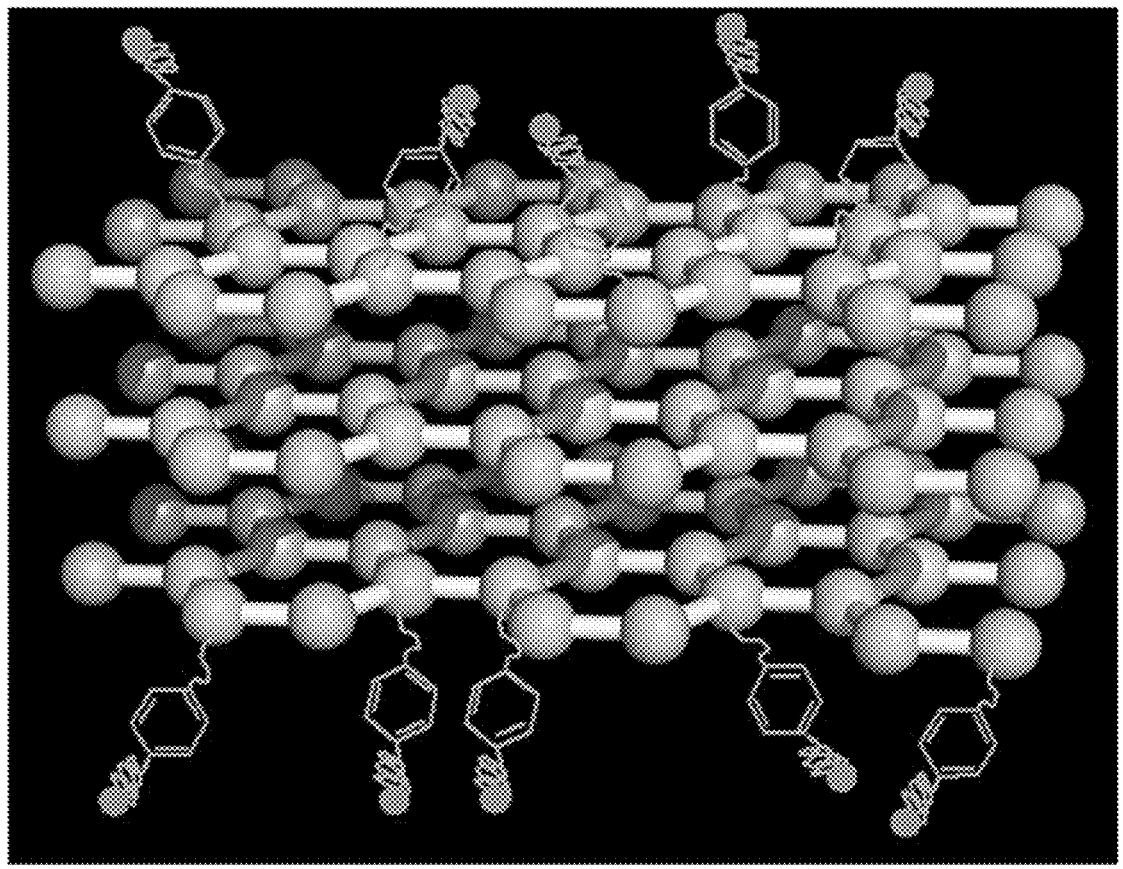
FIG. 2 is a schematic presentation of GnP modified via physical surface alteration.

Referring to FIG. 2, physical surface alteration techniques can involve non-covalent treatment of GnP. This can include non-covalent polymer wrapping techniques. In one embodiment, the non-covalent polymer wrapping involves physical adsorption of surfactants or charged polymers onto the surface of GnP.

Some embodiments of physical surface alteration can involve adsorption of poly acrylic acid (PAA). For instance, GnPs can be added to deionized water to form a mixture, wherein PAA can be added to the mixture. The mixture may be sonicated and stirred. The GnPs of the mixture can be filtered to be separated out. The GnPs can be washed by deionized water to remove excess or residual PAA.

Some embodiments of physical surface alteration can involve adsorption of polyvinyl pyrrolidone (PVP) and sodium dodecyl sulfate (SDS). For instance, GnPs can be dispersed in deionized water with the aid of an SDS solution to form a mixture, wherein PVP can be mixed into the mixture. The mixture can be sonicated and then incubated. The GnPs of the mixture can filtered to be separated out. The GnPs can be washed with deionized water to remove excess or residual SDS.

After physical surface alteration, the modified GnP can be used as a component to form a cementitious nanocomposite. The adsorption of surfactants that occurs during physical surface alteration can enhance the dispersion of modified GnP in the cementitious nanocomposite when the modified GnP is used to form that cementitious nanocomposite. Enhancing the dispersion of the GnP is defined herein as allowing or causing the GnP to be more uniformly dispersed throughout the cementitious nanocomposite (and/or the cement when the cementitious nanocomposite is used to form the cement). The dispersion of the GnP is enhanced due to the introduction of a small hydrophilic head group, a benzene ring, and/or a long alkyl chain (e.g., PVP and SDS). This improves the chemical compatibility of the GnP with their matrix by enhancing their wetting or adhesion characteristics and reducing their tendency to agglomerate while in the cementitious nanocomposite. It should be noted, however, the non-covalent polymer wrapping of the GnP does not affect the inherent $\pi$-bonds., and thus there is a positive impact that enhances bonding strength inside the cement matrix.

Figure 3:
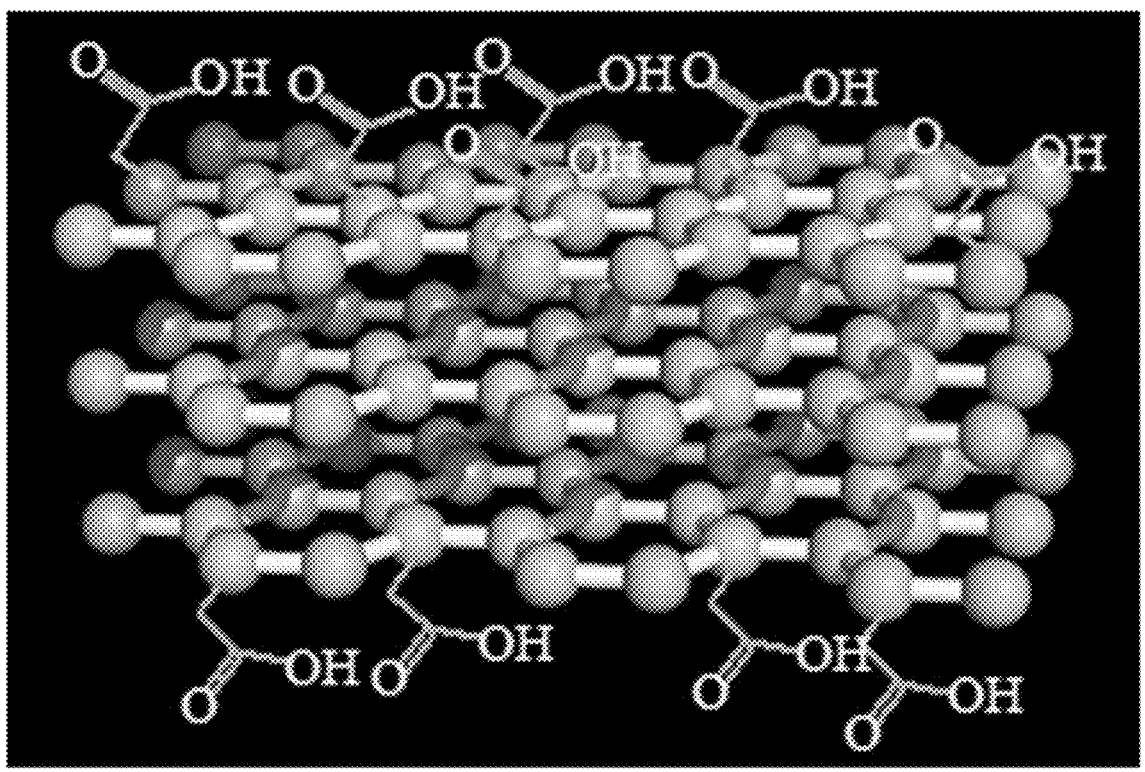
FIG. 3 is a schematic presentation of GnP modified via chemical surface energy alteration.

Referring to FIG. 3, chemical surface energy alteration techniques can involve covalent treatment of GnP. This can include the formation of carboxyl and hydroxyl groups onto the surface of the GnP. In some embodiments, oxygen functionalization can be achieved via acid functionalization. In some embodiments, the oxygen functionalization can introduce hydrophilic groups on the free surfaces of graphite sheets, thereby improving the chemical compatibility of the GnPs with their matrix by enhancing their wetting or adhesion characteristics and reducing their tendency to agglomerate.

Embodiments of chemical surface energy alteration can involve generating a solution of nitric and sulfuric acids. GnP can be added to the solution, followed by stirring. The GnPs can be washed by deionized water and HCl. The GnP can then be held still, wherein a top part of the diluted mixture is removed. This washing process may be repeated if the sulfate ions are still detectable in the diluted mixture. The technique can further include washing the GnPs by acetone to remove carboxylated carbonaceous fragments (CCFs), which are organic molecules having condensed aromatic graphitic rings with several functional groups. CFFs are formed during GnP functionalization. The GnPs can be iteratively washed by centrifugation until a clean and colorless diluted mixture is obtained, indicating that the GnPs are free from CFFs.

After chemical surface energy alteration, the modified GnP can be used as a component to form a cementitious nanocomposite. The oxygen functionalization of GnP surfaces that occurs during chemical surface energy alteration introduces hydrophilic groups on the free surfaces of graphite sheets. This improves the chemical compatibility of the GnP with their matrix by enhancing their wetting or adhesion characteristics and reducing their tendency to agglomerate while in the cementitious nanocomposite. In addition, CCFs are as reactive as functionalized carbon nanoparticles in hydrating cement, but their reaction does not result in the mechanical reinforcement of the cementitious nanocomposite (i.e., does not result in improved interfacial adhesion) used to make the cement. Rather, it is the chemical reaction of CCF-free carbon GnPs that enhances the interfacial mechanical bonds for improved interfacial adhesion. Moreover, edge planes of GnP are highly reactive sites, while the basal planes are inert. The functional groups (e.g., carboxyl groups such as —COOH or —C=O) induced through oxygen functionalization of the GnP surface tend to be more easily formed on the GnP edge rather than on the basal plane. The formation of functional groups on the GnP edges ameliorate the mechanical properties of the cementitious nanocomposite by enhancing interfacial adhesion. Enhancing interfacial adhesion is defined herein as generating higher bond strength between the modified GnPs and the hydrations (C—S—H, calcium hydroxide, etc.) of cement.

In addition to using modified GnPs to influence the dispersion uniformity and interfacial adhesion of the GnPs in the cementitious nanocomposite, the concentration of the modified GnP can be adjusted to further enhance the mechanical and durability characteristics.

In addition to the physical surface alteration and/or chemical surface energy alteration, other dispersion techniques can be used to augment the dispersion methods disclosed herein. This can include mechanical dispersion via ultrasonication and high shear stirring, for example.

It should be noted that embodiments of the cementitious nanocomposite can include modified GnPs having altered surface energies via chemical surface energy alteration, physical surface alteration, or both. For instance, some embodiments of the cementitious nanocomposite can include modified GnPs that have been modified via both physical surface alteration and chemical surface energy alteration. Some embodiments of the cementitious nanocomposite can include modified GnPs, where some of the modified GnPs have been modified via physical surface alteration and some of the modified GnPs have been modified via chemical surface energy alteration.

EXAMPLE 1—COVALENT CHEMICAL TREATMENT: ACID FUNCTIONALIZATION

Figure 4:
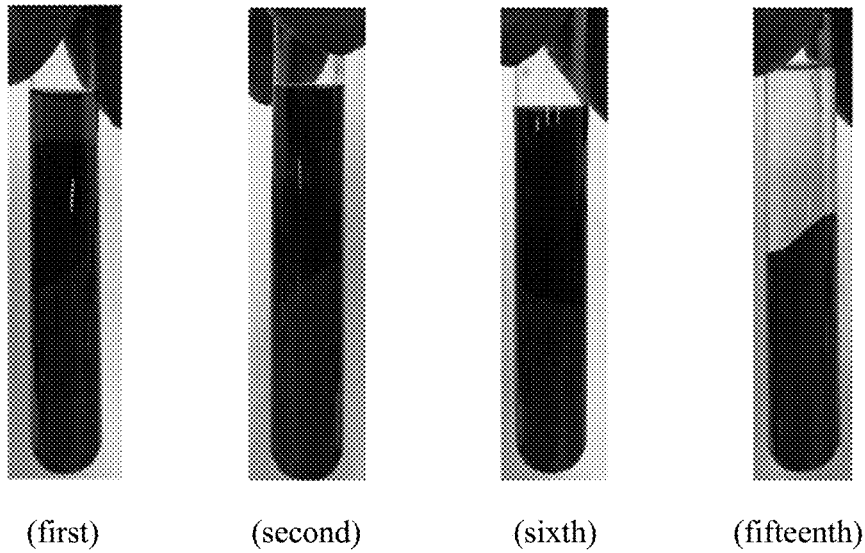
FIG. 4 shows functionalized GnP at different stages of acetone washing.

A mixed solution of nitric (70 wt. %) and sulfuric (96 wt. %) acids with a volume ratio of 1:3 were provided. 1 wt. % GnPs were added to the solution, and the mixture was stirred for 4 hours at 80° C. Then, GnPs were washed by deionized (DI) water and 5% HCl. To this end, after adding DI water or HCl to the mixture, it was held still for 24 hr, and then the top part of the diluted mixture was carefully removed. This washing process was repeated if the sulfate ions were detectable in the diluted mixture. The process of washing by acetone was continued to remove CCFs. These fragments are organic molecules consisted of condensed aromatic graphitic rings with several functional groups are formed during GNP functionalization. CCFs are as reactive as functionalized carbon nanoparticles with hydrating cement but their reaction does not result in the mechanical reinforcement of the produced composite. It is the chemical reaction of CCF-free carbon nanoparticles with hydration products that is significant in forming interfacial mechanical bonds. Therefore, GnPs were iteratively washed by centrifugation until clean and colorless diluted mixture is obtained. FIG. 4 shows the functionalized GnPs at different stages of acetone washing.

EXAMPLE 2—NON-COVALENT PHYSICAL TREATMENT: POLYMER WRAPPING

Two different approaches for polymer wrapping of GnPs: (1) using the poly acrylic acid (PAA) and (2) applying the combination of PVP and SDS were evaluated.

PAA 1 gram of GnPs were added to 133 mL DI water. 10% PAA by weight of GnPs was also added to the mixture. The mixture was sonicated for 30 min in ambient temperature and stirred overnight. Sonication was performed using a Fisher Scientific, FS30D with the ultrasonic power of 130 W and the operating frequency of 40 kHz. Then, the mixture was filtered through 0.2 μm filter and followed by deionized water washing for three times to remove excess PAA.

Figure 5:
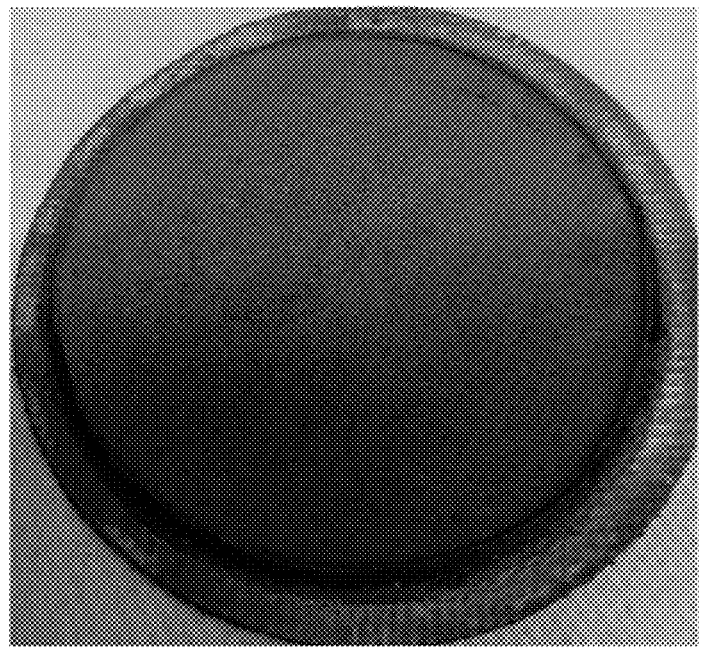
FIG. 5 shows a prepared wet filter cake of GnPs after polymer wrapping (physical surface alteration).

Combination of PVP and SDS 1 gram of GnPs were dispersed in 400 mL DI water with the aid of $$1\% \ SDS \ \text{concentration}(\frac{M_{SDS}}{1000 \ \text{mL water}} \times 100 = 1\%).$$

$$1\% \text{ by weight of } PVP(\frac{M_{PVP}}{M_w + M_{SDS} + M_{PVP} + M_{GnPs}} \times 100 = 1\%)$$

was also mixed to the blend. $M_x$ (x=PVP, SDS, GNPs, and w) is the mass of the corresponding material x, for example, $M_w$ is the mass of water. The mixture was sonicated for 30 min. Then, the mixture was incubated at 50° C. for 12 hours. GnPs were then filtered through a 0.2 μm filter, washed with DI water and this was followed to remove any residual SDS. FIG. 5 shows the final obtained filter cake after the procedure of polymer wrapping.

EXAMPLE 3—PREPARATION OF CEMENT SLURRY

The modified GnPs were re-dispersed in the amount of distilled water required to prepare the cementitious matrix. The mixture of water and acid functionalized GNPs were sonicated for 1 hr and stirred for 3 hr. The mixture of water and modified GnPs by polymer wrapping were sonicated for 2 hr and followed by stirring overnight. Then, API class-G cement was added to the mixture in the mixer. The ratio of water/cement was 0.44 by weight. For the case when GnPs were modified using polymer wrapping, the nanoadditive concentration of 0.13% by weight of cement (BWOC) was examined. For the case when GnPs were subjected to the acid functionalization procedure, the effect of different concentrations of GnPs was examined on the overall behavior of cement. To this end, the following volume ratios were considered, $$\frac{V_{GNPs}}{V_{dehydrated \ cement}} \times 100 = 0.4, \ 0.2, \text{ and } 0.1\%,$$

in which, $V_x$ is the volume of the material x, GnPs or the dehydrated cement.

Studies were conducted on the cement slurry prepared above to examine the effects of surface modified GnPs on the overall mechanical properties of the nanocomposite cements. The ultimate compressive strength and the modulus of toughness of cement samples were calculated. Toughness is important specially to improve post-failure behavior of the cement, preventing unstable brittle fracture propagation. Inasmuch as the compressive strength alone is not enough to indicate a cement system's ability for providing zonal isolation throughout the lifetime of a well and after abandonment, additional experiments were conducted to better understand the mechanical response of cement systems to downhole conditions. To this end, rheological properties of cement samples at two different temperatures of 120° F. and 190° F. as well as the room temperature 73.4° F., thickening time under high-pressure high-temperature (HPHT) conditions, free fluid, shear bond strength, flexural strength, and depth of penetration into narrow spaces were measured.

Ultimate Compressive Strength

To measure the compressive strength, cubic samples of cement composed of modified GnPs were prepared. Cubic cement samples with 2×2×2 in. dimensions were prepared and cured under 3000 psi and 190° F. for 24 hr then examined using MTS machine. Both surface modification methods, acid functionalization and polymer wrapping, were examined as to their effects on the overall compressive strength of nanocomposite cement pastes. For each concentration of GnPs, two cubic samples are tested.

Figure 6:
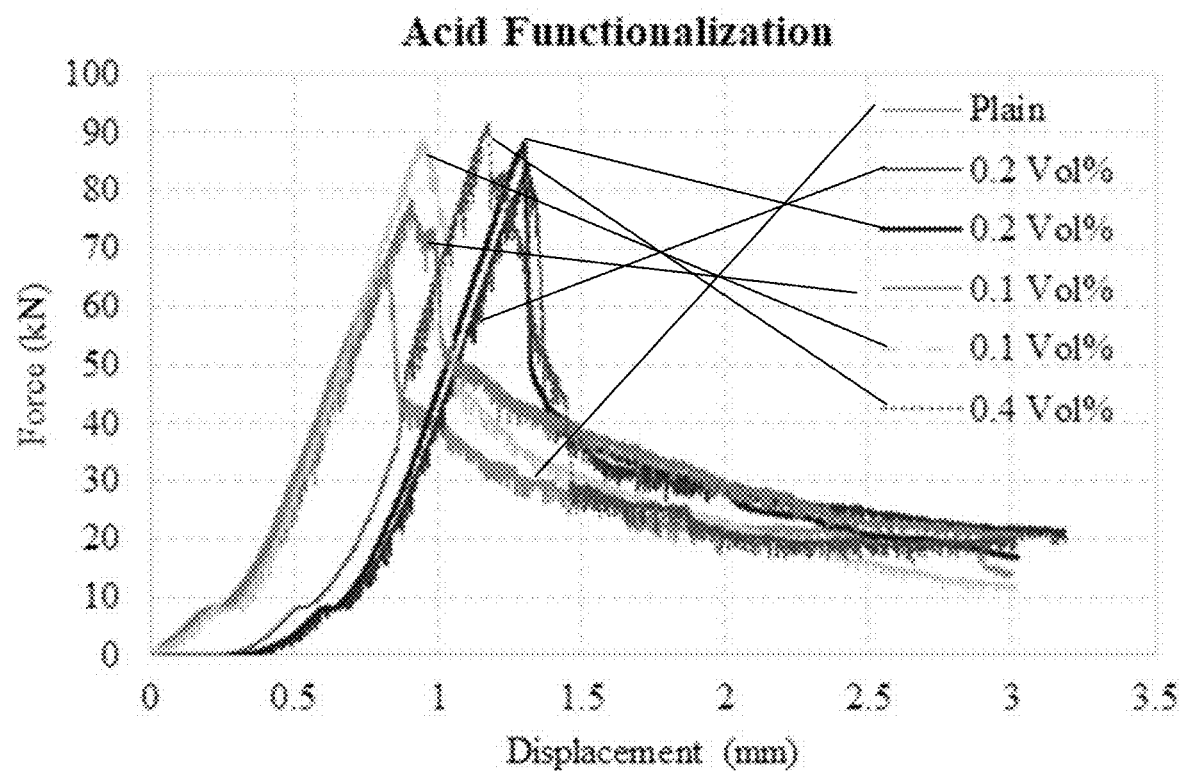
FIG. 6 is a graph showing compressive behavior of nanocomposite cement pastes fabricated with chemically modified GnPs.

FIG. 6 is a Displacement v. Force plot examining how different concentrations of functionalized GnPs by acid modification affect the overall compressive strength of cement. Different volume ratios of GnP/dehydrated cement, 0.1, 0.2, and 0.4 Vol. % were considered As seen in FIG. 6, these volume ratios of GnP almost result in the same magnitude of compressive strength, about 42% greater than the compressive strength of the plain cement sample. But different uniaxial deformations happen at the ultimate compressive strength. In the following, the displacements achieved at the peak load corresponding to the modified cement samples are compared with that of the plain cement. The displacements corresponding to 0.1, 0.2 and 0.4 Vol. % of GnPs increase, respectively, about 44%, 74% and 56% in comparison to that of the plain cement. For further comparison, the effect of different concentrations of GnPs on the modulus of toughness of the cement paste is also examined. To this end, the stress-strain curves corresponding to the results presented in FIG. 6 are first plotted and, then, the area under the curve is calculated and tabulated in Table 1. As it is seen from Table 1, the cement prepared using modified GnPs shows slightly greater toughness than the plain cement. The maximum moduli of toughness are corresponding to 0.1 and 0.2 Vol %.

TABLE 1

Comparison between the toughness of plain cement and cements composed of different concentrations of GNPs.
Toughness (MJ · m$^{-3}$)

| Plain | 0.1 Vol % | 0.2 Vol % | 0.4 Vol % |
|---|---|---|---|
| 4.0512 | 4.1724 | 4.1362 | 4.0635 |

Figure 7:
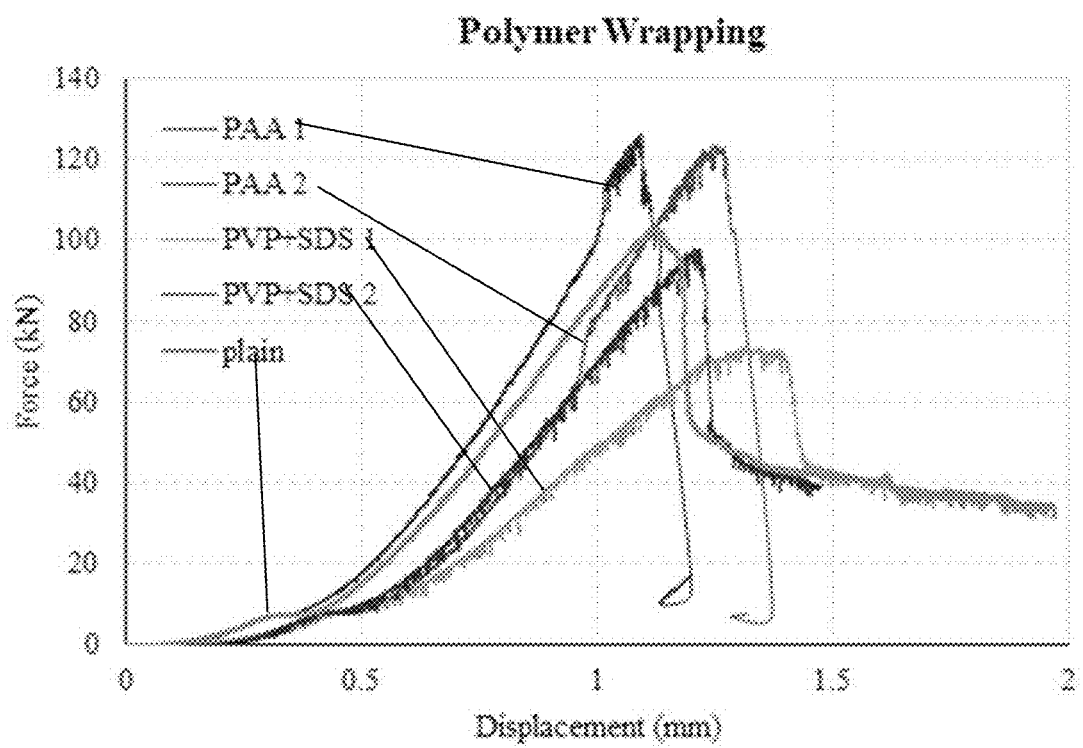
FIG. 7 is a graph showing compressive behavior of nanocomposite cement pastes fabricated with physically modified GnPs.

FIG. 7 presents the compressive behavior of prepared cement pastes using physically modified GnPs. This figure includes both methods of polymer wrapping: (1) using PAA and (2) applying the combination of PVP and SDS. For the samples fabricated from GnPs modified by PAA, the compressive strength increases up to 23.67% in comparison with the plain sample. But as it can be seen from FIG. 7 for the above-mentioned samples, the force drops down sharply after reaching to the ultimate load, exhibiting the brittle behavior. Examination of the samples prepared using modified GnPs by the combination of PVP and SDS reveals that the compressive strength does not improve, however the brittle behavior after reaching to the ultimate strength does not happen. In other words, surface modification of GnPs using the combination of PVP and SDS slightly improves the ductility of the cement paste in contrast to the ultimate strength which decreases. The more ductile the cement is allows for more loading cycles and a certain degree of deformation before reaching failure.

Rheological Characterization

The rheological characterization of the modified cement slurries by GnPs was also examined. The deformation and flow behavior of cement slurries at room temperature as well as two elevated temperatures were studies to understand cement rheology in deep-well cementing operations. For non-Newtonian fluids, the relationship between the shear stress, $\tau$ and the shear rate, $\dot{\gamma}$ in the steady laminar flow can be described by mathematical models. In the well cementing industry, the following models are commonly used, 1) Power-law model $$\tau = k\dot{\gamma}^n, \quad (1)$$

$$\mu = k\dot{\gamma}^{n-1}, \quad (2)$$

2) Bingham plastic model $$\tau = \tau_y + \mu_p\dot{\gamma}, \quad (3)$$

$$\mu = \mu_p + \frac{\tau_y}{\dot{\gamma}}, \quad (4)$$

3) Herschel-Bulkley model $$\tau = \tau_y + k\dot{\gamma}^n, \quad (5)$$

$$\mu = \frac{\tau_y + k\dot{\gamma}^n}{\dot{\gamma}}, \quad (6)$$

where, $\mu$ is the viscosity of fluid, determined as the ratio of the shear stress, $\tau$ to the shear rate, $\dot{\gamma}$. The shear stress can be proportional to the friction pressure gradient or friction losses, and the shear rate is the velocity gradient of fluid perpendicular to the fluid movement. The Bingham plastic model requires two parameters, the yield stress, $\tau_y$ and the slope of the line, known as the plastic viscosity $\mu_p$. This model presents the behavior of fluid which remains unsheared until the applied stress reaches the minimum value, $\tau_y$ known as Bingham yield stress. The SI units of $\tau_y$ and $\mu_p$ are, respectively, $[\tau_y]$=Pa s and $[\mu_p]$=Pa. In the case of power-law model, k is the flow consistency index with the SI unit [k]=Pa s$^n$, and n, the dimensionless parameter, is known as the flow behavior index. Based on this model, flow commences when the shear stress exceeds to the yield stress and, then, follows with the power-law behavior.

The Fann viscometer model 35 was used to measure the gel strength and the rheological properties of cement slurries. The cement slurry was sheared between an outer rotor and an inner cylinder. The rotor spined at different rotational speeds, $\Omega$=300, 200, 100, 6, 3 rpm and exerted a torque to the inner cylinder by slurry. This torsional deflection was indicated on a dial which is read. For each rotational speed, $\Omega$, the measured values of ramp-up and ramp-down dial readings, $\theta$, were averaged. Then, data analysis was performed by converting $\Omega$ and $\theta$ to shear rates and shear stresses at the inner cylinder, respectively. To this end, the following equations were used $$\dot{\gamma}=16.28\Omega, \text{ when } [\Omega]=\text{rad/s}, \tag{7}$$

or $$\dot{\gamma}=1.705\Omega, \text{ when } [\Omega]=\text{rpm}. \tag{8}$$

$$\tau=0.5109\theta, \text{ when } [\theta]=\text{Pa}, \tag{9}$$

or $$\tau=1.067\theta, \text{ when } [\theta]=\text{lbf/100 ft}^2 \tag{10}$$

The test was conducted at the room temperature T=73.4° F. and two other elevated temperatures of T=120° F. and 190° F. The cement slurry was prepared by adding 0.2 Vol. % functionalized GnPs. The obtained data are presented in Table 2.

TABLE 2

Viscometer readings for the cement slurry containing 0.2 Vol. % functionalized GnPs at three different temperatures, T = 73.4, 120, and 190° F.

| | $\theta$ at 73.4° F. [lbf/(100 ft²)] | | | $\theta$ at 120° F. [lbf/(100 ft²)] | | | $\theta$ at 190° F. [lbf/(100 ft²)] | | |
|---|---|---|---|---|---|---|---|---|---|
| $\Omega$ (rmp) | Ramp-up | Ramp-down | Ave. | Ramp-up | Ramp-down | Ave. | Ramp-up | Ramp-down | Ave. |
| 300 | 131 | 138 | 134.5 | 276 | 260 | 268 | 295 | 294 | 294.5 |
| 200 | 119 | 125 | 122 | 254 | 237 | 245.5 | 284 | 279 | 281.5 |
| 100 | 104 | 110 | 107 | 215 | 205 | 210 | 235 | 236 | 235.5 |
| 6 | 39 | 38 | 38.5 | 60 | 35 | 47.5 | 37 | 25 | 31 |
| 3 | 21 | 17 | 19 | 35 | 21 | 28 | 20 | 17 | 18.5 |

Figure 8A:
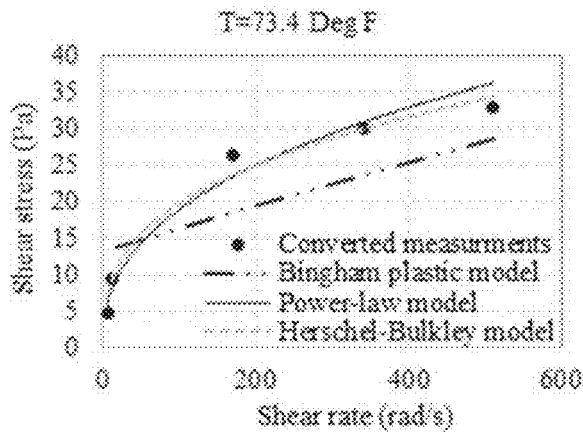
FIGS. 8A-8C are graphs showing mathematical models of shear stress-shear rate curves at room temperature, T=120° F., and T=190° F., respectively.
Figure 8B:
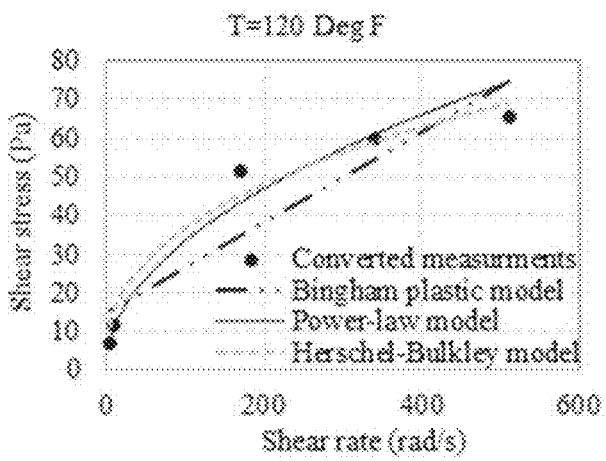
Figure 8C:
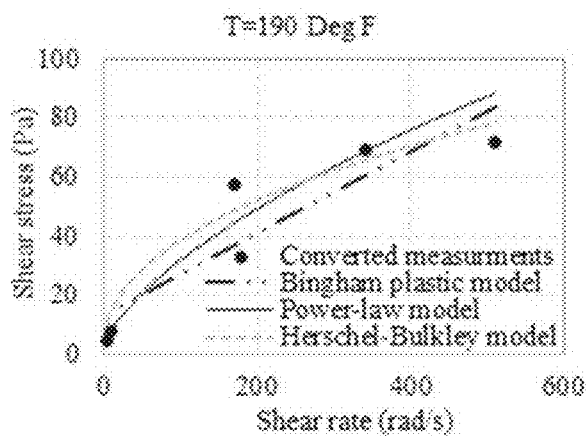

For the purpose of data analysis, the converted measurements of shear stresses corresponding to each shear rate were fitted to the mathematical models of power-law, Bingham plastic, and Herschel-Bulkley models. FIGS. 8A-8C show how these models fit the shear stress-shear rate curves.

For further clarification, the rheological model parameters are also given in Table 3. It is found that, fitting of the Herschel-Bulkley model at 73.4° F. and 120° F. results in $\tau_y$=0, which presents the power-law model. However, for the case when T=190° F., the Herschel-Bulkley model leads to $\tau_y$=1.3919 Pa. From Table 3, it can be concluded that the Herschel-Bulkley model fits the rheological behavior of the cement slurry better than the Bingham plastic and power-law models. Considering the Herschel-Bulkley model, it is seen from FIGS. 8A-8C that the viscosity decreases as the shear rate increases, indicating shear thinning fluid. In the case of power-low fitting, the index n is also obtained less than 1, which predicts the behavior of shear thinning fluid. Moreover, from Table 3, it is found that the index n corresponding to the power-law model increases from 0.3997 to 0.6303 by raising the temperature from 73.4° F. to 190° F. Note that, when the index n is 1, the fluid is Newtonian.

TABLE 3

Rheological Model Parameters for the prepared cement slurry at three different temperatures, T = 73.4, 120, and 190° F.

| | Fitting model | Correlation Coefficient, R | n | $\tau_y$ (Pa) | k (Pa · s$^n$) | $\mu_p$ (Pa · s) |
|---|---|---|---|---|---|---|
| T = 73.4° F. | Bingham plastic | 0.9163 | — | 13.287 | — | 0.0299 |
| | Power-law | 0.9863 | 0.3997 | — | 2.9883 | — |
| | Herschel-Bulkley | 0.9889 | 0.3411 | 0.0 | 4.0835 | — |
| T = 120° F. | Bingham plastic | 0.9190 | — | 14.867 | — | 0.1166 |
| | Power-law | 0.9800 | 0.4953 | — | 3.3949 | — |
| | Herschel-Bulkley | 0.9881 | 0.3891 | 0.0 | 6.1081 | — |
| T = 190° F. | Bingham plastic | 0.9077 | — | 13.368 | — | 0.1385 |
| | Power-law | 0.9596 | 0.6303 | — | 1.7359 | — |
| | Herschel-Bulkley | 0.9771 | 0.4632 | 1.3919 | 4.3168 | — |

Figure 9A:
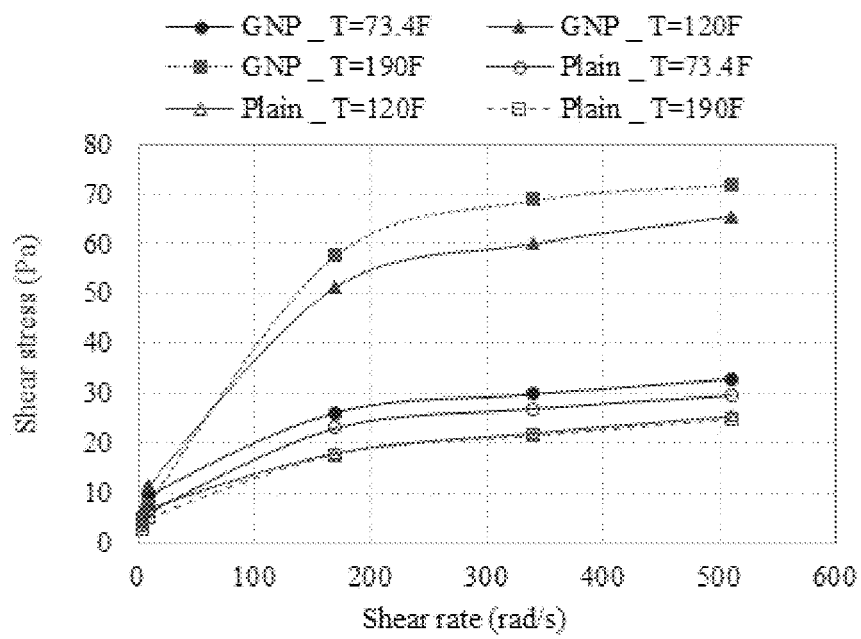
FIGS. 9A-9B are graphs showing shear stress-shear rate curves of a prepared cement slurry at different temperatures and their corresponding viscosity, respectively.
Figure 9B:
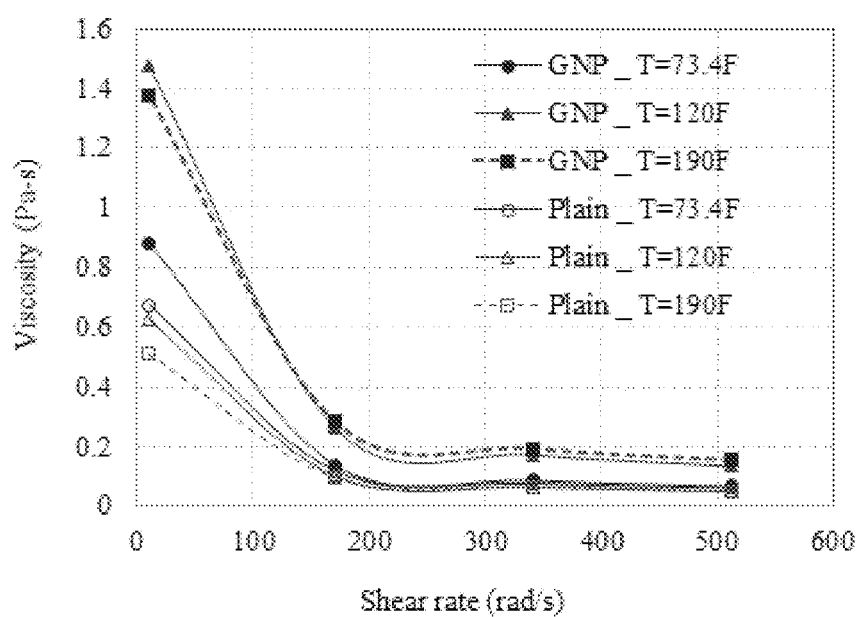

The shear stress-shear rate curves corresponding to different temperatures are compared in FIG. 9A. As it is found from this figure, when the cement slurry is composed of GNPs the shear stress increases as the temperature increases, while the increase of temperature decreases the shear stress for the plain cement. The viscosity of the cement slurry is also calculated from Eq. (6) using the shear stress-shear rate curve fitted by the Herschel-Bulkley model and plotted in FIG. 9B. Therefore, the change of the viscosity of cement slurries versus temperature in the presence or absence of GNPs is understood. FIG. 9B presents the role of temperature and the presence of GNPs on the change of viscosity. For the cement slurry including acid-functionalized GNPs, it is in general obtained from FIG. 9B that the elevation of temperature from the room temperature increases the viscosity of the slurry. Although, the increase of temperature decreases the viscosity of the plain cement.

The gel strength, which is a measure of the attractive forces between the particles in a fluid under static conditions, was also measured. To this end, the sample was thoroughly stirred at 300 rpm. Then, the rotational speed was set to be equivalent to 3 rpm, and the viscometer is turned off for 10 minutes. After turning on the viscometer, the peak dial reading presents the gel strength. For the sample prepared by 0.2 Vol % modified GnP, the gel strength was measured as 17 lbf/(100 ft$^2$) which is equivalent to 8.14 Pa. For the sake of comparison, the gel strength corresponding to the plain cement is also measured which is obtained as 22 lbf/(100 ft$^2$) equivalent to 10.53 Pa. Therefore, for the cement sample including modified GnP, the gel breaks at slightly lower shear stress in comparison to the neat cement. Inasmuch as, static gel strength is related to the annular fluid migration, the lower measurement corresponding to the modified cement shows its better movability than the plain cement.

Thickening Time Characterization

Figure 10A:
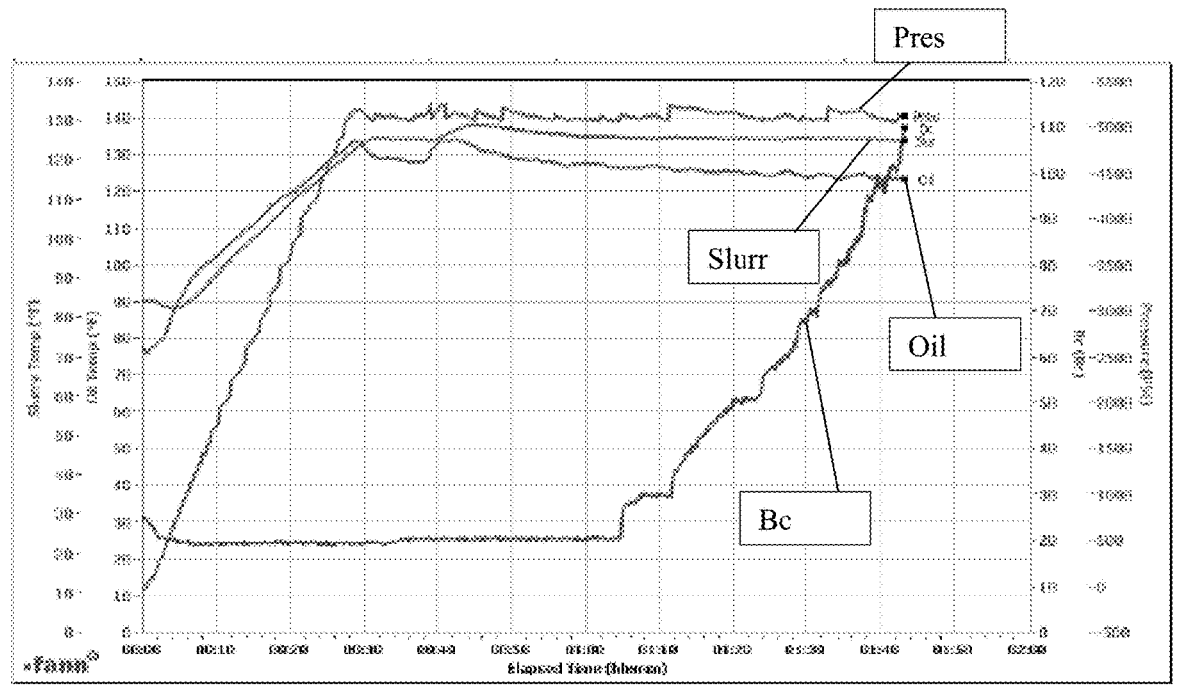
FIGS. 10A-10C are graphs showing HPHT thickening time results for 0.1, 0.2, and 0.4 Vol. % acid-functionalized GnPs, respectively.
Figure 10B:
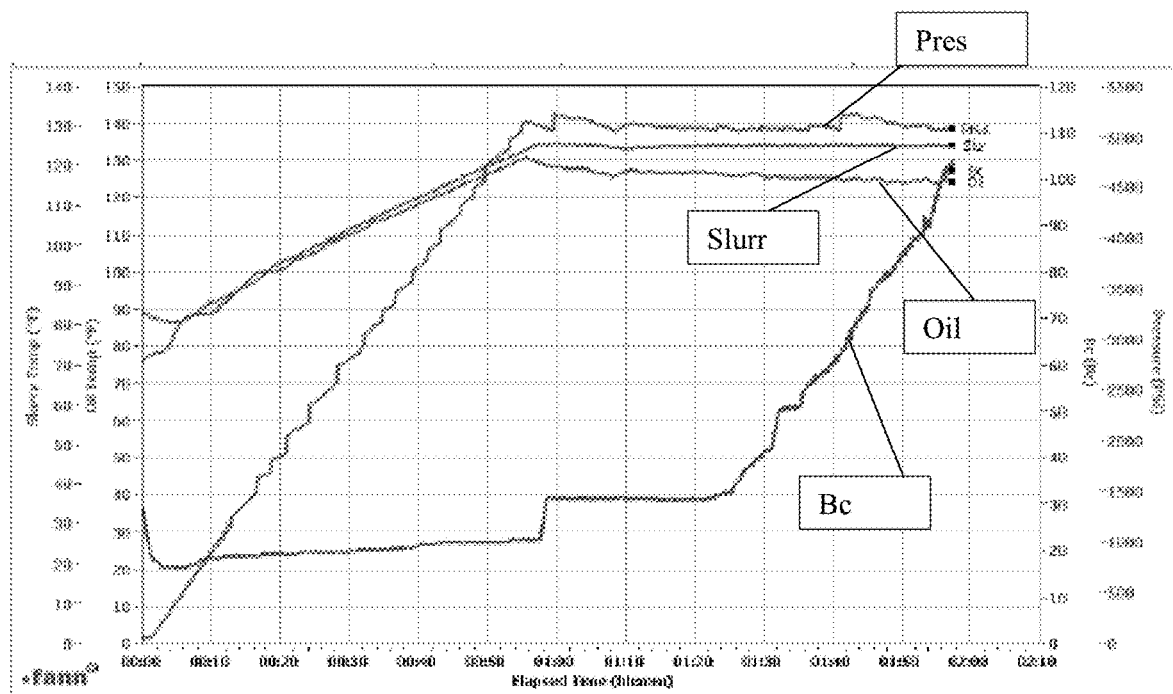
Figure 10C:
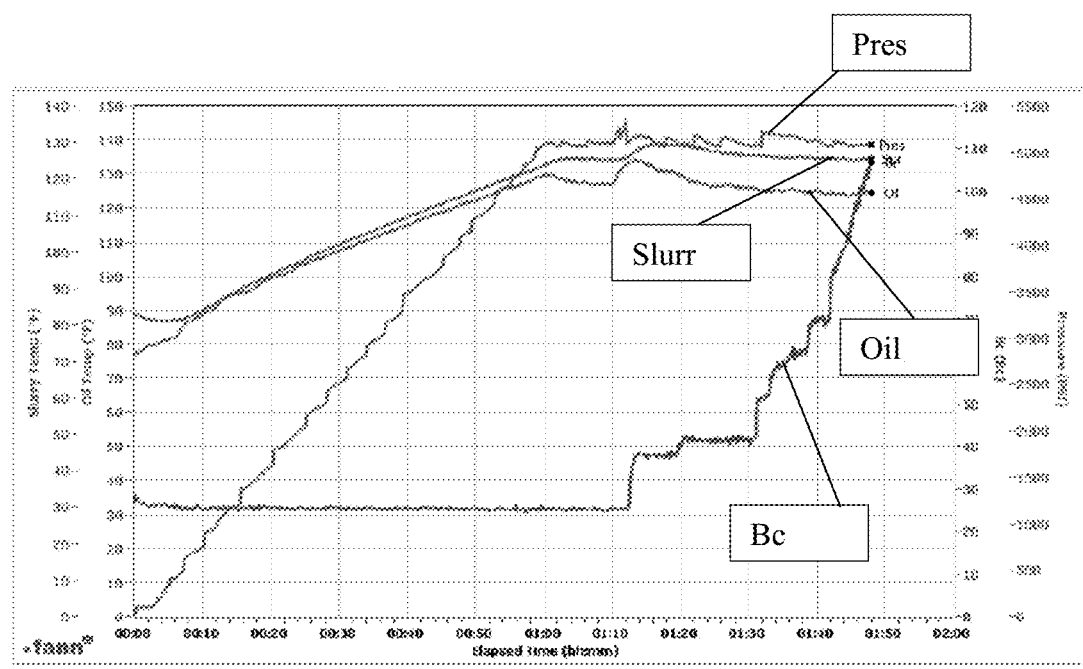

Standard HPHT thickening time tests were conducted to measure the length of time the prepared cement slurry remains in the pumpable state at the temperature 52° C. and the pressure 5160 psi. The cement slurry consistency was measured in Bearden units of consistency ($B_c$), which is a dimensionless quantity which cannot be transformed directly to viscosity values. The thickening time was measured as the time at which the cement slurry reaches a consistency of 100 $B_c$. The time when the consistency starts to increase is called the point of departure. Cement samples having different concentrations of GnP, 0.10, 0.20, and 0.40 Vol. % were examined. The results corresponding to 0.10, 0.2 and 0.40 Vol. % concentrations of GnP are given in FIGS. 10A-10C, respectively. Furthermore, the consistency of different cement samples having different concentrations of GNP is also compared in FIG. 11. As it is seen from FIGS. 10-11, the presence of GNPs slightly increases the thickening time. The thickening time measured for the neat cement slurry (including no GNPs) is about 01 h:35 m, while it becomes about 01 h:40 m, 01 h:55 m, and 01 h:45 m, for 0.1, 0.2, and 0.4 vol. % concentrations of GNPs, respectively.

How the concentration of GnP affects the consistency-time behavior of the prepared cements is discussed in the following paragraph.

Figure 11:
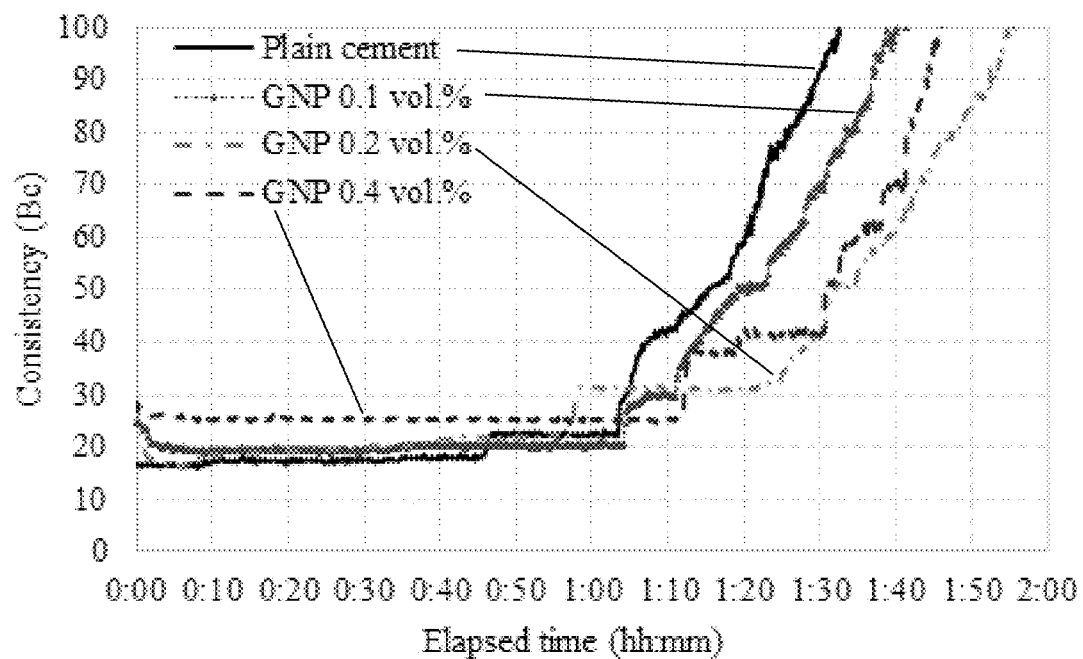
FIG. 11 is a graph comparing consistency of different cement samples having different concentrations of acid-functionalized GnPs.

It is seen from FIG. 11, the departure time for the neat cement slurry and the cement slurry composed of 0.1 vol. % of GNPs is approximately 01 h:05 m. The increase of GNPs concentration from 0.1 vol. % to 0.2 vol. % decreases the departure time to about 55 m. Immediately after departure time, the viscosity of slurries including 0.2 and 0.4 vol. % concentration of GNPs shows a small jump. Showing a sudden increase in the slurry viscosity brings the attention toward the potentiality of fabrication of right-angle set (RAS) cement slurries by tuning the concentration and surface properties of GNPs. Such systems are sometimes characterized by standard HPHT thickening time tests, in such a way that, the slurry viscosity increases from a low consistency to more than 100 $B_c$ within a few minutes. RAS cement slurries develop a low-permeability matrix which enables to significantly prevent gas intrusion up to the commencement of cement setting. It should be noted that the mechanism of set involving for RAS cement slurries is not like that of the high-gel strength systems. In general, it is the gel strength properties that determines the ability of a setting cement slurry to resist the influx of well bore fluids.

Free Fluid Measurement

When the cement particles are not dispersed completely, they interact with each other through the electrostatic forces, leading to the formation of a flocculated structure. Typically, the weight of the cement particles is transmitted to the bottom of slurry by the gel lattice and, consequently, a structural deformation happens within the cement. Due to this phenomenon, water is squeezed out of the lower parts of the slurry and migrates upward the less-stressed upper layers. The capacity of the higher layers to accommodate the additional water is limited and, thus, a layer of water may accumulate at the top of the cement slurry. This separation and movement of water from the bottom of the slurry upward the higher layers can remain channels within the cement, which will promote the probability of gas migration and impair zonal isolation. In other words, the free water could coalesce to form a continuous channel on the upper side of the hole and develop a privileged path by which the gas may migrate.

Based on this phenomenon, a study was conducted to measure this separation tendency for the slurries made of different concentrations of GnPs, 0.1, 0.2 and 0.4 Vol. %, using the procedure documented in API RP 10B. To this end, 250 mL of the prepared slurry was poured into a graduated cylinder with 0° of inclination and held still for 2 hr. To prevent water evaporation, the top of the cylinder was covered. Then, the amount of water accumulated at the top of the slurry was measured. For the sake of comparison, the study included an experiment for the plain cement slurry without GnPs. For this case, the free fluid was measured as 1.0 mL. However, when the cement slurries were prepared by adding the surface modified GnPs, these nanoadditives do not induce any free water separation. In other words, zero free fluid was measured for different concentrations of GnPs, 0.1, 0.2 and 0.4 Vol. %. It is noteworthy to mention that if GnPs are not efficiently dispersed within the cementitious matrix, a nonzero free fluid is obtained. For example, an experiment with 0.2 Vol. % of GnPs was conducted where they were not completely dispersed. The resultant measurement of free fluid was about 0.6 mL for this case, while it becomes zero when GnPs were efficiently dispersed.

Shear Bond Strength Improvement

One of the primary goals of the cement sheath in a wellbore is providing zonal isolation. As noted above, the cement of the cement sheath is subjected to severe conditions during the life of a producing oil/gas well that can affect the permeability of the cement matrix. Cracking, debonding, and shear failure are the main contributors to these conditions. Lack of strong bonding between cement and formation can lead to the shear failure, resulting in the complete failure of the cement sheath. The subsidence and movement of formation as the oil or gas reservoir is depleted, as well as vibrations, caused by downhole pumps or gas-lift operations increase the effective stress around a wellbore and may cause shear failure.

Figure 12A:
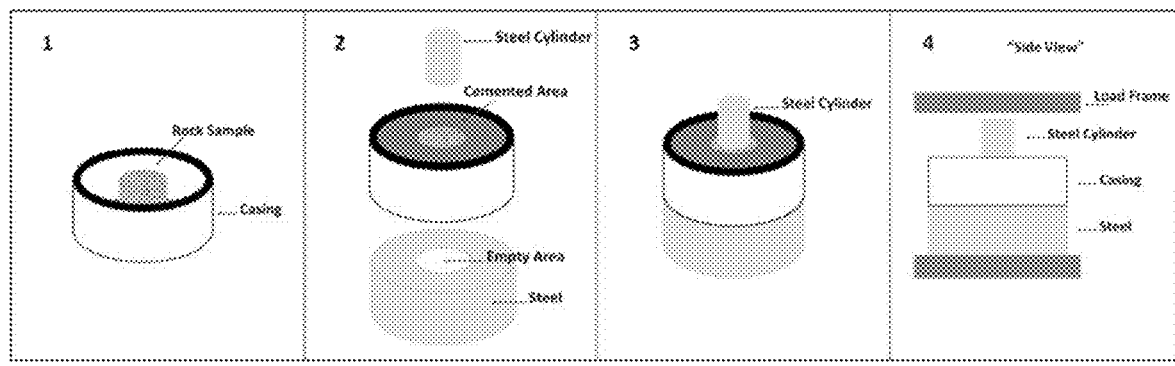
FIGS. 12A-12B illustrate an exemplary experimental set-up for a modified push-out tests, and dimension of steel casing used in the set-up, respectively.
Figure 12B:
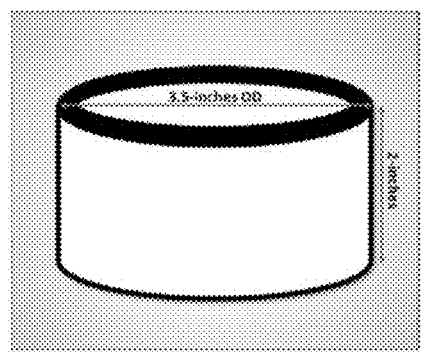

A study was conducted to examine the effect of acid-functionalized GnP on the shear bond strength at the cement-shale formation interface. To this end, a modified push-out test was employed. Setup includes a cylindrical shale core, cement, and steel pipe, as shown in FIG. 12A. Dimensions of steel casing is presented in FIG. 12B, and the diameter of the formation core was 1 in. To mimic downhole conditions, cement was cured under high pressure and high temperature conditions for 24 hours. Then, the prepared sample was subjected to a push-out force by the displacement control loading mode with 0.3 mm/min rate. Part 4 in FIG. 12A illustrates how the load is applied to the shale core using a steel cylinder.

Figure 13:
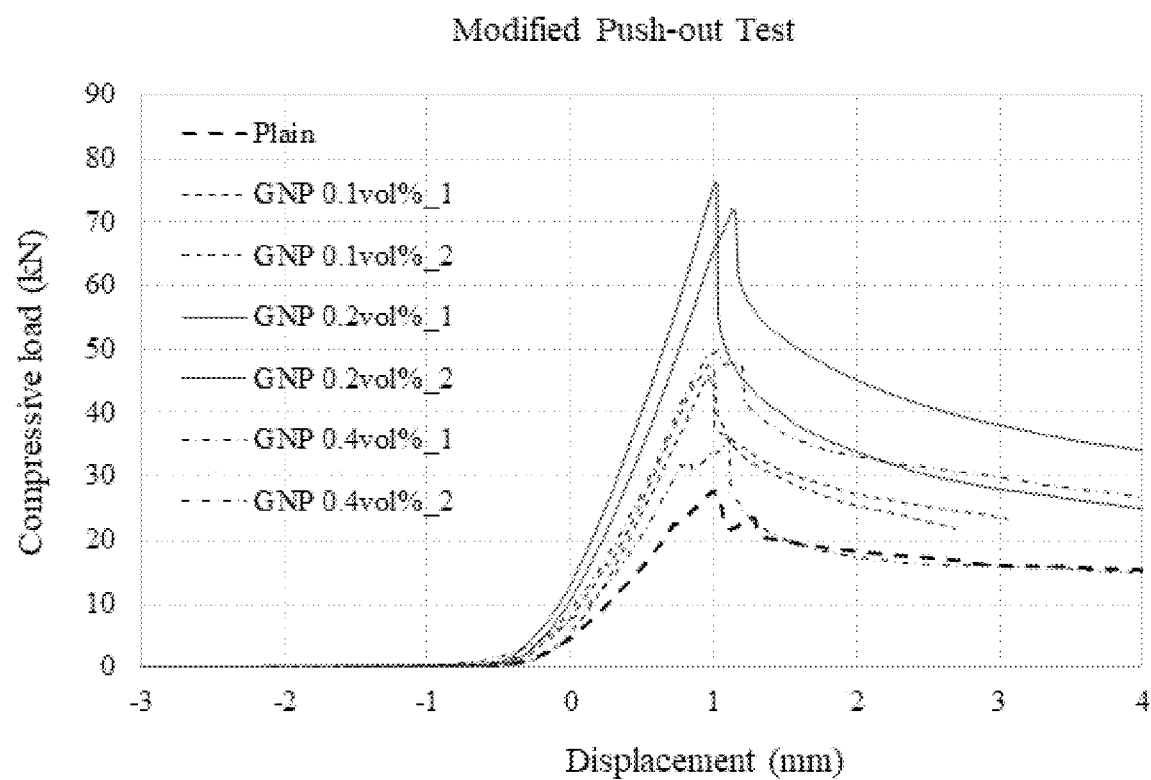
FIG. 13 is a graph comparing push-out test results for plain cement and cement including different concentrations of acid-functionalized GnP, 0.1, 0.2, and 0.4 vol. %.

The results obtained from push-out tests corresponding to the cement slurries with different GNP concentrations of 0.1, 0.2, and 0.4 vol. % as well as the plain cement are compared in FIG. 13. As it is seen, cements composed of acid-functionalized GNPs show higher shear bond strength in comparison with the plain sample. The highest improvement is achieved by adding 0.1 and 0.2 vol. % of GNPs to the cement slurry, which results in the increase of the shear strength about 71% and 175% as compared to the plain cement, respectively.

Flexural Strength Improvement

The cement sheath under harsh downhole conditions will be exposed to a combination of tension, compression and shear loads, which will particularly threat the integrity of wellbore due to the inherent low tensile strength of cement. Flexural strength of materials is one of the principal properties to evaluate their mechanical response under tensile loading.

Three-point flexural tests are conducted in the lab to examine how acid-functionalized GNPs affect the tensile strength of the prepared nano-reinforced cements. Beam-shape cement samples with the width of b=1 in., the depth of d=0.5 in., and the length of 5 in. satisfying Timoshenko beam criteria are prepared. The span length, the distance between supports in the three-point load test, is L=4 in. A displacement-controlled loading with the rate of 0.1 mm/min is utilized.

Figure 14:
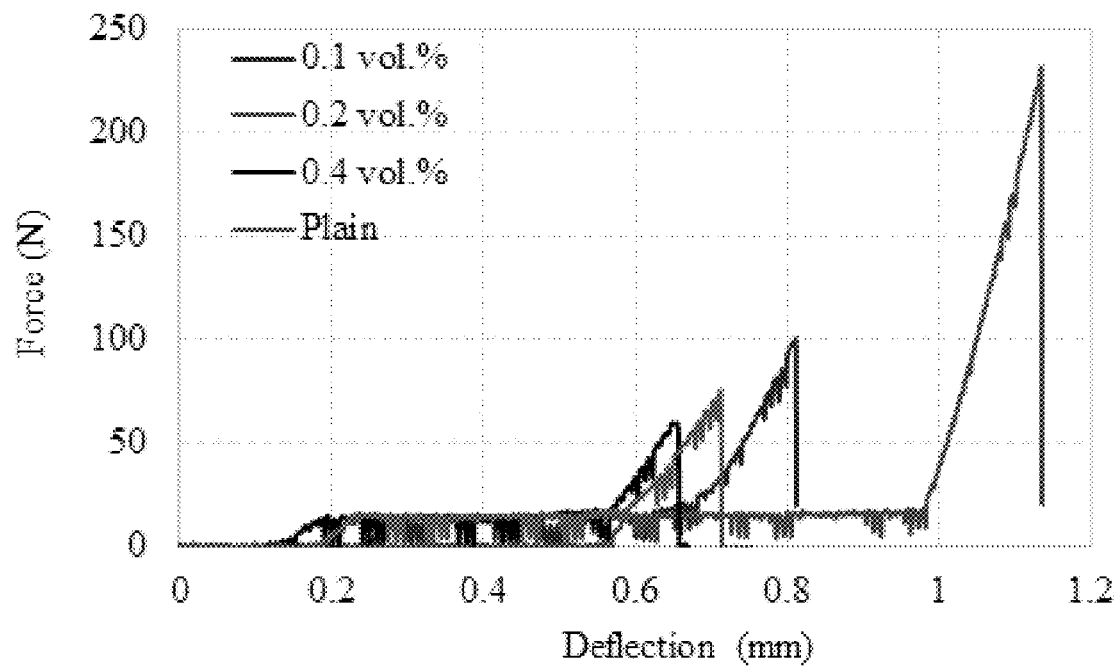
FIG. 14 is a graph comparing flexural test (three-point bending test) results for plain cement and cement including different concentrations of acid-functionalized GnP, 0.1, 0.2, and 0.4 vol. %.

FIG. 14 illustrates the experimental response of cement beams composed of different concentration of GNPs, 0.1, 0.2, 0.4 vol. %, as well as the plain cement under flexural test. As it is seen, 0.2 vol. % of acid-functionalized GNPs significantly increases the flexural strength of the cement nanocomposite as compared to the plain cement. Precisely, 0.2 vol. % concentration of acid-functionalized GNPs increases the flexural strength of the nano-reinforced cement about 209% in comparison to the plain cement sample.

SEM Imaging to Evaluate Microstructural Improvement

Figure 15A:
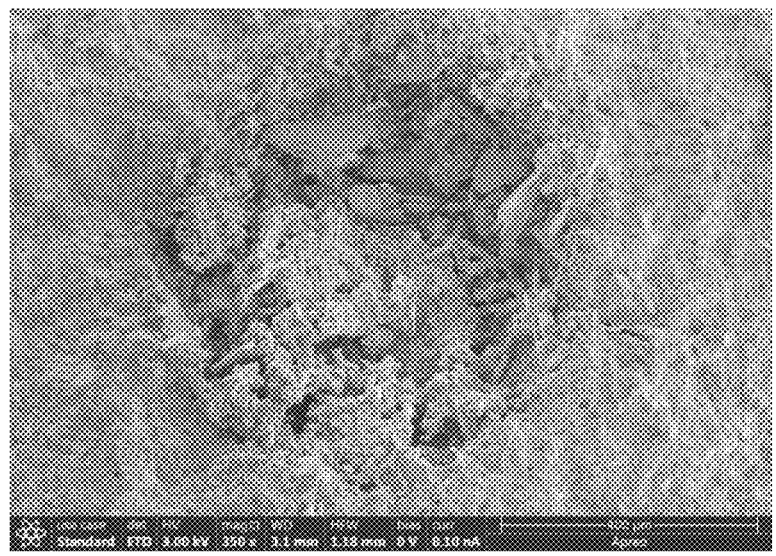
FIGS. 15A-15D illustrate the scanning electron microscopy (SEM) images of an exemplary for the microstructural effects of chemically surface-modified GnPs on pore refinement. Images are taken from the fracture surface of cement composed of 0.2 vol. % GnPs after conducting flexural test.
Figure 15B:
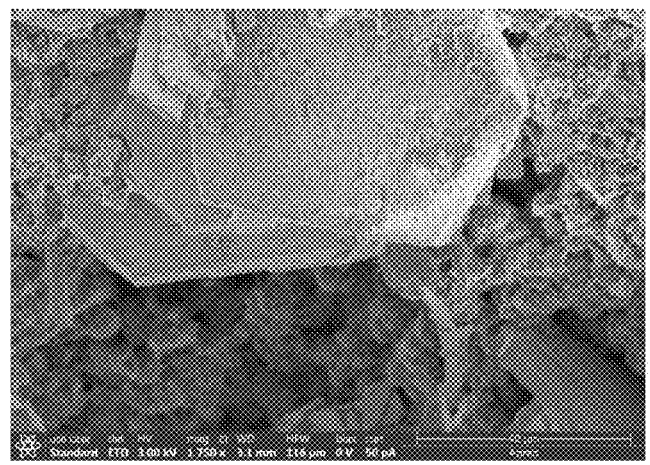
Figure 15C:
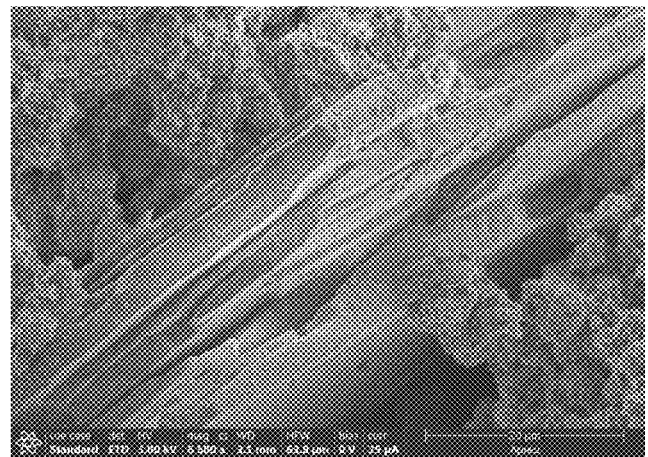
Figure 15D:
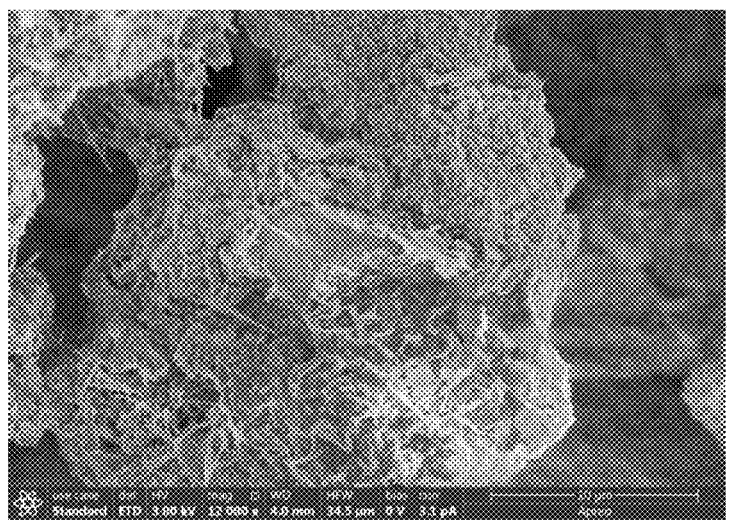

FIGS. 15A-15D illustrate SEM images captured from different locations on the fracture surface of cement nanocomposite composed of 0.2 vol. % surface-modified GNPs. The effect of acid-functionalized GNPs on the pore refinement is examined. FIG. 15A displays a pore on the fracture surface of the cement nanocomposite, revealing the formation of thin platelets inside the pore. For a further elaboration, the magnified microstructure of these platelets is also provided in FIGS. 15B and 15C. The polyhedral form of hydration crystals can be seen in FIG. 15B, and the formation of a thin platelet with the thickness of about 2 μm can be observed in FIG. 15C. The production of entangled cloud-like networks inside the pores/voids was also captured, as shown as an example in FIG. 15D.

For the plain cement, none of the above-mentioned interior features is observed.

Injection Test for Squeeze Treatment

The appropriateness of the cement slurry composed of surface-modified GNPs for the squeeze treatments is also examined.

Squeeze cementing is the process of placing cement slurry from surface to downhole to penetrate through narrow spaces behind the casing and/or perforations placed in the casing. Mainly, a squeeze job is conducted to repair a faulty primary cement job, to isolate formation intervals, to alter formation characteristics, and to finally repair some casing problems. Of some reasons requiring squeeze cement treatments are the presence of micro-annuli at the casing-cement or the cement-formation interfaces, improper displacement of drilling-fluid, and gas influx into the cemented annulus.

Better penetration into narrow spaces behind the casing is one of the prerequisite of squeeze-cement.

Figure 16:
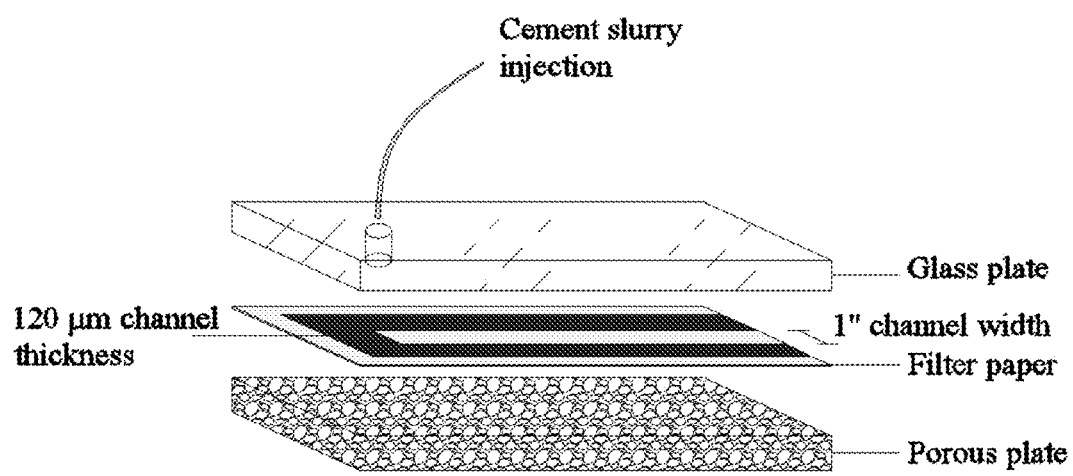

FIG. 16 illustrates an exemplary set-up for injection cell. It is composed of a channel with the thickness of 120 μm and the width of 1 in. The channel is made over a filter paper. Then, to resemble the formation a filter paper is laid over a porous layer of aluminum which is mimicking the formation. A transparent and very smooth plate (made of glass) is placed on the channel to represent the casing. A hole is drilled in the glass plate to inject the cement slurry into the channel using a syringe pump.

Figure 17A:
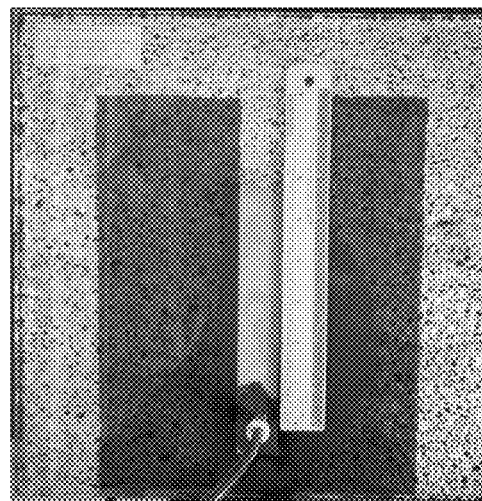
FIGS. 17A-17B are graphs comparing the capability of cement slurries to penetrate narrow spaces for plain cement and cement including 0.2 vol. % acid-functionalized GnPs.
Figure 17B:
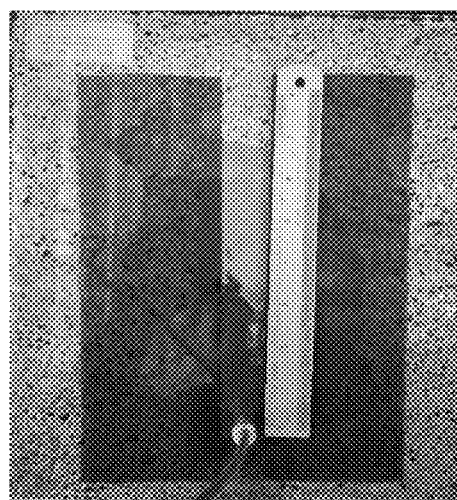

FIGS. 17A-17B gives how deep cement slurry can penetrate into the channel for the plain cement and the cement slurry including 0.2 vol. % surface-modified GNPs, respectively. As it is seen, about 250% more penetration is achieved for the cement nanocomposite as compared to the plain cement.

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof.

It should be understood that modifications to the embodiments disclosed herein can be made to meet a particular set of design criteria. For instance, any of the surface energy alteration techniques, dispersion methods, or any other component or operating parameter can be any suitable number or type of each to meet a particular objective. Therefore, while certain exemplary embodiments of the apparatus and methods of using and making the same disclosed herein have been discussed and illustrated, it is to be distinctly understood that the invention is not limited thereto but may be otherwise variously embodied and practiced within the scope of the following claims.

What is claimed is:

1. A method of modifying the surface energy of graphite nanoplatelets (GnP), the method comprising:
    A process of acid functionalizing a surface of GnP via chemical surface energy alteration, wherein the chemical surface energy alteration generates a functional group on the surface of GnP; and
    removing, by washing GnP with acetone, carboxylated carbonaceous fragments (CCFs) formed on the surface of the GnP during the acid functionalizing process.

2. The method recited in claim 1, wherein the functional group is a hydrophilic group.

3. The method recited in claim 1, wherein:
    chemical surface energy alteration involves covalent treatment of GnP.

4. The method recited in claim 3, wherein:
    chemical surface energy alteration involves the formation of carboxyl and hydroxyl groups via acid functionalization.

5. The method recited in claim 4, wherein:
    chemical surface energy alteration involves:
    generating a solution comprising nitric acid and sulfuric acid, adding GnP to the solution, stirring the solution, and washing GnP with deionized water and HCl.

* * * * *